US012645104B2

(12) United States Patent (10) Patent No.: US 12,645,104 B2
Kondo et al. (45) Date of Patent: Jun. 2, 2026

(54) PHOTONIC CRYSTAL ELEMENT

(71) Applicant: NGK Insulators, Ltd., Nagoya-City (JP)

(72) Inventors: Jungo Kondo, Miyoshi-City (JP);
Makoto Iwai, Kasugai-City (JP);
Keiichiro Asai, Nagoya-City (JP);
Tomoyoshi Tai, Inazawa-City (JP);
Kentaro Tani, Nagoya-City (JP)

(73) Assignee: NGK INSULATORS, LTD., Nagoya (JP)

( * ) Notice: Subject to any disclaimer, the term of this patent is extended or adjusted under 35 U.S.C. 154(b) by 522 days.

(21) Appl. No.: 18/062,733

(22) Filed: Dec. 7, 2022

(65) Prior Publication Data

US 2023/0112992 A1     Apr. 13, 2023

Related U.S. Application Data

(63) Continuation of application No. PCT/JP2021/027594, filed on Jul. 26, 2021.

(30) Foreign Application Priority Data

Jul. 27, 2020    (JP) ................................. 2020-126208

(51) Int. Cl.
*G02F 1/025* (2006.01)
*G02B 6/122* (2006.01)
(Continued)

(52) U.S. Cl.
CPC ........... *G02F 1/025* (2013.01); *G02B 6/1225* (2013.01); *G02F 1/2257* (2013.01); *H01P 1/20* (2013.01);
(Continued)

(58) Field of Classification Search
CPC .................. G02B 6/1225; G02B 1/005; G02B 2006/1213; G02B 6/122; G02B 6/12007;
(Continued)

(56) References Cited

U.S. PATENT DOCUMENTS 7,228,042 B2 * 6/2007 McNab .................. B82Y 20/00
                                                       385/27
7,242,839 B2 7/2007 Sakai et al.
(Continued)

FOREIGN PATENT DOCUMENTS

JP        2003-227953 A        8/2003
JP        2005-274840 A        10/2005
(Continued)

OTHER PUBLICATIONS

Hasegawa, Machine Translation of JP 2009-212494 A. (Year: 2009).*
(Continued)

*Primary Examiner* — Michelle R Connelly
(74) *Attorney, Agent, or Firm* — BURR PATENT LAW, PLLC

(57) ABSTRACT

Provided is a photonic crystal element, which shows small delay of an electric signal, shows a small propagation loss, and has uniform characteristics over its entirety. The photonic crystal element includes a two-dimensional photonic crystal slab having holes periodically formed in a substrate made of a ceramics material, the photonic crystal element being configured to guide an electromagnetic wave having a frequency of 30 GHz or more and 20 THz or less.

16 Claims, 9 Drawing Sheets

(51) Int. Cl.
 *G02F 1/225*     (2006.01)
 *H01P 1/20*      (2006.01)
 *H01Q 15/14*     (2006.01)

(52) U.S. Cl.
 CPC ......... *H01Q 15/14* (2013.01); *G02F 2202/32*
                    (2013.01)

(58) Field of Classification Search
 CPC .. G02F 2202/32; G02F 2203/13; G02F 1/025;
     G02F 1/2257; H01P 3/16; H01P 5/1022;
      H01P 1/20; H01P 3/003; H01P 5/087;
                    H01Q 15/14
 See application file for complete search history.

(56) References Cited

U.S. PATENT DOCUMENTS

| | | | |
|---|---|---|---|
| 7,611,578 B2 | 11/2009 | Morrison et al. | |
| 8,705,920 B2 | 4/2014 | Tokushima | |
| 9,496,622 B2 | 11/2016 | Fujita et al. | |
| 9,632,247 B2 | 4/2017 | Fujita et al. | |
| 11,137,487 B1 * | 10/2021 | Amarloo | H01Q 15/24 |
| 2004/0179803 A1 | 9/2004 | Bourelle | |
| 2004/0264903 A1 | 12/2004 | Dridi et al. | |
| 2006/0249070 A1 | 11/2006 | Morrison et al. | |
| 2007/0280592 A1 | 12/2007 | Furuya et al. | |
| 2008/0298744 A1 | 12/2008 | Wang | |
| 2015/0241630 A1 * | 8/2015 | Fujita | G02B 6/125 |
| | | | 398/43 |

FOREIGN PATENT DOCUMENTS

| | | | | |
|---|---|---|---|---|
| JP | 2006-517735 A | 7/2006 | | |
| JP | 2008-299031 A | 12/2008 | | |
| JP | 2009212494 A * | 9/2009 | | B82Y 20/00 |
| JP | 2015-162787 A | 9/2015 | | |
| JP | 2015-187716 A | 10/2015 | | |
| JP | 6281868 B2 | 2/2018 | | |
| JP | 2019-082518 A | 5/2019 | | |
| WO | 2010/073708 A1 | 7/2010 | | |

OTHER PUBLICATIONS

Japanese Office Action (with English Translation) dated Dec. 6, 2022 (Application No. 2021-567018).

International Search Report and Written Opinion (Application No. PCT/JP2021/027594) dated Oct. 12, 2021.

English translation of the International Preliminary Report on Patentability (Chapter I) dated Jan. 31, 2023 (Application No. PCT/JP2021/027594).

German Office Action (Application No. 11 2021 003 953.9) dated Mar. 14, 2025 (with English translation) (11 pages).

* cited by examiner

PHOTONIC CRYSTAL ELEMENT

CROSS-REFERENCE TO RELATED APPLICATIONS

This application is a continuation under 35 U.S.C. 120 of International Application PCT/JP2021/027594 having the International Filing Date of 26 Jul. 2021 and having the benefit of the earlier filing date of Japanese Application No. 2020-126208, filed on 27 Jul. 2020. Each of the identified applications is fully incorporated herein by reference.

BACKGROUND OF THE INVENTION

Technical Field

The present invention relates to a photonic crystal element.

Background Art

The development of a photonic crystal element serving as one electro-optical element has been advanced. The applications and development of the photonic crystal element in a wide variety of fields including an optical waveguide, next-generation high-speed communication, a sensor, laser processing, and photovoltaic power generation have been expected. For example, the development of a photonic crystal element as a waveguide for waves ranging from a millimeter wave to a terahertz wave, the waveguide serving as a key to the next-generation high-speed communication, has been advanced. A technology including using a two-dimensional photonic crystal slab formed of a semiconductor material has been proposed as an example of such photonic crystal element (Patent Literature 1). However, a photonic crystal element based on such technology involves the following problems: its dielectric constant is relatively large, and hence the delay of an electric signal is large; a propagation loss in a waveguide formed of the element is large; and variations in characteristics thereof depending on an azimuth and polarization are large.

CITATION LIST

Patent Literature

[PTL 1] JP 6281868 B2

SUMMARY OF THE INVENTION

A primary object of the present invention is to provide a photonic crystal element, which shows small delay of an electric signal, shows a small propagation loss, and has uniform characteristics over its entirety.

According to one embodiment of the present invention, there is provided a photonic crystal element, including a two-dimensional photonic crystal slab having holes periodically formed in a substrate made of a ceramics material, the photonic crystal element being configured to guide an electromagnetic wave having a frequency of 30 GHz or more and 20 THz or less.

In one embodiment, the photonic crystal element further includes: a support substrate arranged below the substrate, the support substrate being configured to support the substrate; a joining portion configured to integrate the substrate and the support substrate with each other; and a cavity defined by a lower surface of the substrate, an upper surface of the support substrate, and the joining portion.

In one embodiment, the ceramics material is polycrystalline or amorphous.

In one embodiment, the substrate has pores each having a pore size of 1 μm or more at a ratio of from 0.5 ppm to 3,000 ppm.

In one embodiment, a period of the holes is from 10 μm to 1 mm.

In one embodiment, the substrate has a dielectric constant of from 3.6 to 11.5 at from 100 GHz to 10 THz.

In one embodiment, the substrate has a dielectric loss of 0.01 or less.

In one embodiment, the substrate has a resistivity of 100 kΩ·cm or more.

In one embodiment, the ceramics material is one selected from the group consisting of: quartz; aluminum nitride; aluminum oxide; silicon carbide; magnesium oxide; and spinel.

In one embodiment, the photonic crystal element further includes a waveguide defined in a portion in the substrate where the holes are free from being formed, the waveguide being configured to guide the electromagnetic wave having a frequency of 30 GHz or more and 20 THz or less.

In one embodiment, the photonic crystal element is usable as an antenna, a band-pass filter, a coupler, a delay line, or an isolator.

In one embodiment, the photonic crystal element further includes: a support substrate arranged below the substrate, the support substrate being configured to support the substrate; and an active element capable of at least one of transmission, reception, or amplification of the electromagnetic wave, the active element being supported by the support substrate.

In one embodiment, the photonic crystal element further includes: a line-defect first waveguide defined in a portion in the substrate where the holes are free from being formed; and a second waveguide positioned between the active element and the first waveguide in a propagation path of the electromagnetic wave, the second waveguide being capable of guiding the electromagnetic wave.

In one embodiment, the photonic crystal element further includes: a line-defect waveguide defined in a portion in the substrate where the holes are free from being formed; and a resonator defined in the portion in the substrate where the holes are free from being formed, the resonator being positioned between the active element and the waveguide in a propagation path of the electromagnetic wave, and being capable of guiding the electromagnetic wave.

In one embodiment, the substrate and the support substrate are directly joined to each other.

In one embodiment, the support substrate has a depressed portion, and the photonic crystal element includes a cavity defined by a lower surface of the substrate and the depressed portion of the support substrate.

In one embodiment, the photonic crystal element further includes: an insulating layer positioned between the substrate and the support substrate; and a cavity defined by a lower surface of the substrate, an upper surface of the support substrate, and the insulating layer.

Advantageous Effects of Invention

According to the embodiment of the present invention, a predetermined hole pattern is formed in the substrate made of the ceramics material, and hence the photonic crystal element, which shows small delay of an electric signal and shows a small propagation loss, can be achieved. In one embodiment, the ceramics material is made polycrystalline or amorphous, and hence the photonic crystal element, which has uniform characteristics over its entirety in addition to the above-mentioned excellent characteristics, can be achieved.

BRIEF DESCRIPTION OF THE DRAWINGS

FIG. 11A is an illustration of a first unit cell, and FIG. 11B is an illustration of a second unit cell.

DESCRIPTION OF EMBODIMENTS

Embodiments of the present invention are described below. However, the present invention is not limited to these embodiments.

Figure 1:
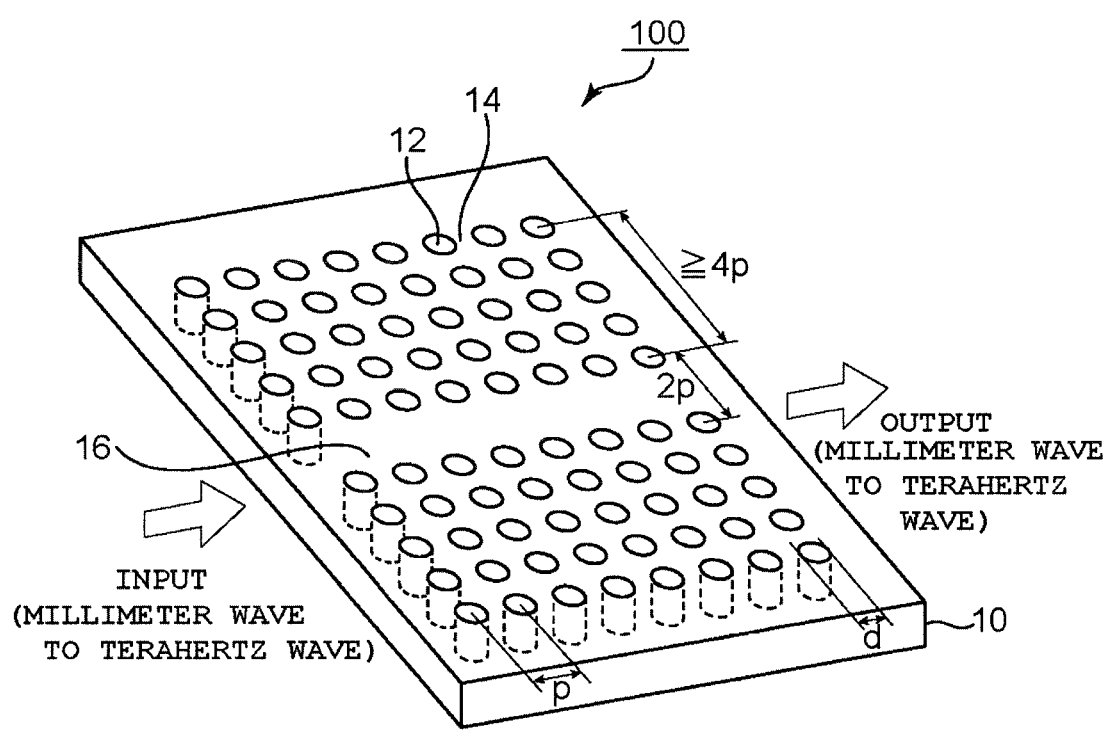
FIG. 1 is a schematic perspective view of a photonic crystal element according to one embodiment of the present invention.

FIG. 1 is a schematic perspective view of a photonic crystal element according to one embodiment of the present invention. A photonic crystal element 100 of the illustrated example includes a two-dimensional photonic crystal slab having holes 12 in a substrate 10 made of a ceramics material. A photonic crystal is a multidimensional periodic structural body formed by arranging a medium having a large refractive index and a medium having a small refractive index at a period comparable to the wavelength of light or an electromagnetic wave, and has the band structure of the light or the electromagnetic wave similar to the band structure of an electron. Accordingly, appropriate design of the periodic structure can express a forbidden band (photonic band gap) for predetermined light or a predetermined electromagnetic wave. A photonic crystal having a forbidden band functions as an object that neither reflects nor transmits light or an electromagnetic wave having a predetermined wavelength. The introduction of a line defect into the photonic crystal having a photonic band gap results in the formation of a waveguide mode in the frequency region of the band gap, and hence can achieve a waveguide that propagates light or an electromagnetic wave with a low loss.

The photonic crystal element according to the embodiment of the present invention can typically function as a waveguide that guides waves ranging from a millimeter wave to a terahertz wave. The term "millimeter wave" typically refers to an electromagnetic wave having a frequency of from about 30 GHz to about 300 GHz, and the term "terahertz wave" typically refers to an electromagnetic wave having a frequency of from about 300 GHz to about 20 THz.

The term "photonic crystal element" as used herein encompasses both of a wafer (photonic crystal wafer) having formed thereon at least one photonic element and a chip obtained by cutting the photonic crystal wafer.

As described above, the photonic crystal element of the illustrated example includes the two-dimensional photonic crystal slab. The two-dimensional photonic crystal slab refers to a photonic crystal obtained by arranging, on a thin plate obtained by thinning a dielectric material (typically, a ceramics material) to a level comparable to the wavelength of an electromagnetic wave to be used, low-refractive index portions each including a material having a refractive index lower than the refractive index of the material for forming the thin plate at appropriate two-dimensional periodic intervals in accordance with purposes and a desired photonic band gap. In the illustrated example, the holes 12 function as the low-refractive index portions, and a portion 14 between the holes 12 and 12 of the substrate 10 functions as a high-refractive index portion. A portion in the substrate 10 where the periodic pattern of the holes 12 is not formed serves as a line defect, and the line defect portion forms a waveguide 16. An upper clad and a lower clad each having a refractive index lower than that of the thin-plate slab may be arranged above and below the thin-plate slab as required. In the illustrated example, external environments (air portions) above and below the photonic crystal element 100 function as the upper clad and the lower clad, respectively.

As described above, the substrate 10 includes the ceramics material. The ceramics material that may be used in the embodiment of the present invention has a small dielectric constant (real part) and a small dielectric constant (imaginary part), and hence can reduce the delay and loss of an electric signal propagating in the photonic crystal. Further, the material can reduce a propagation loss in the waveguide. In one embodiment, the substrate includes a sintered body of the ceramics material (e.g., ceramics powder). The sintered body is polycrystalline, and hence can reduce anisotropy in the substrate. Accordingly, a variation in characteristic (typically, dielectric constant) depending on the position of the material in the photonic crystal element, the variation resulting from the anisotropy, can be significantly suppressed. As a result, a propagation loss depending on, for example, the position or direction thereof in the photonic crystal element can be suppressed. From this viewpoint, the ceramics material is preferably polycrystalline or amorphous, more preferably amorphous. An amorphous material can suppress scattering due to a grain boundary peculiar to a polycrystalline material, and hence can further reduce the anisotropy. Thus, an effect of using the ceramics material may be more significant. The use of a polycrystalline or amorphous ceramics material can reduce the complex term of the dielectric constant (representing a loss) at a frequency of, for example, 0.5 THz or less, and reduce a variation therein. Further, while a ripple in which the complex term of a dielectric constant suddenly fluctuates to a large extent in a low-frequency region (e.g., 0.5 THz or less) often occurs in a single crystal, the use of the polycrystalline or amorphous ceramics material can significantly suppress such ripple. A complex dielectric constant may be measured by using, for example, terahertz time-domain spectroscopy.

A semiconductor has heretofore been used as a material for forming a photonic crystal in many cases. This is because the utilization of semiconductor processes, such as photolithography and etching, facilitates the formation of a hole pattern. However, a semiconductor material has a large dielectric constant, and hence enlarges the delay of an electric signal propagating in the photonic crystal. Further, the semiconductor material is a single crystal, and hence has large anisotropy. Accordingly, a variation in characteristic (typically, dielectric constant) of the material depending on the direction in which an electromagnetic wave in a photonic crystal element propagates and the polarization thereof is large. Meanwhile, although the ceramics material (in particular, a sintered body) has an advantage in that both of its dielectric constant and anisotropy are small, the material is chemically stable, and is hence difficult to etch. In addition, the material is so hard as to be unsuitable for machining, and involves problems in terms of a grain boundary and a grain diameter. More specifically, when a photonic crystal is formed, the etching of a hole pattern often advances in a grain unit, and hence the grain boundary and grain diameter of the material may largely affect a variation in hole shape. In addition, there is a problem in that it is generally difficult to reduce the grain diameter. Accordingly, it may be difficult to produce a photonic crystal through the formation of a desired hole pattern depending on the kind of the ceramics material and the structure of the sintered body. The inventors of the present invention have achieved the formation of a hole pattern appropriate as a waveguide for waves ranging from a millimeter wave to a terahertz wave in the sintered body of the ceramics material by adopting the near-net forming of a powder sintering method (substantially, slurry casting), and hence have achieved the application of the sintered body of the ceramics material to a photonic crystal. A method of forming the photonic crystal is described later.

When the substrate (substantially, the ceramics material) is used in an antenna, a band-pass filter, a line, or the like, its dielectric constant at from 100 GHz to 10 THz is preferably from 3.6 to 11.5, more preferably from 3.7 to 10.0, still more preferably from 3.8 to 9.0. When the dielectric constant is excessively small, a desired photonic band gap may not be sufficiently formed in a waveguide for waves ranging from a millimeter wave to a terahertz wave. When the dielectric constant is excessively large, the delay of an electric signal propagating in the photonic crystal may become larger.

The resistivity of the substrate (substantially, the ceramics material) is preferably 100 kΩ·cm or more, more preferably 300 kΩ·cm or more, still more preferably 500 kΩ·cm or more, particularly preferably 700 kΩ·cm or more. When the resistivity falls within such ranges, an electromagnetic wave can be propagated in the material with a low loss without affecting electronic conduction. Although details about the phenomenon are unclear, the following assumption may be made: when the resistivity is small, the electromagnetic wave is coupled with an electron, and hence the energy of the electromagnetic wave is taken by the electronic conduction, with the result that the loss occurs. From this viewpoint, the resistivity is preferably as large as possible. The resistivity may be, for example, 3,000 kΩ (3 MΩ)·cm or less.

The dielectric loss (tan δ) of the substrate (substantially, the ceramics material) is preferably 0.01 or less, more preferably 0.008 or less, still more preferably 0.006 or less, particularly preferably 0.004 or less at the frequency at which the substrate is used. When the dielectric loss falls within such ranges, the propagation loss in the waveguide can be reduced. The dielectric loss is preferably as small as possible. The dielectric loss may be, for example, 0.001 or more.

The bending strength of the substrate is preferably 50 MPa or more, more preferably 60 MPa or more. When the bending strength falls within such ranges, the photonic crystal element can be formed as a single layer of the substrate. In addition, the substrate hardly deforms, and hence the diameters of the holes and the period of the holes become stable. Thus, a photonic crystal element showing small changes in characteristics can be achieved. The bending strength is preferably as large as possible. The bending strength may be, for example, 700 MPa or less.

The coefficient of thermal expansion (coefficient of linear expansion) of the substrate is preferably $10 \times 10^{-6}$/K or less, more preferably $8 \times 10^{-6}$/K or less. When the coefficient of thermal expansion falls within such ranges, the thermal deformation (typically, warping) of the substrate can be satisfactorily suppressed. As a result, by virtue of a synergistic effect with the above-mentioned effect exhibited by the bending strength, there can be achieved a photonic crystal element, which can become independent as a single layer of the substrate, has a sufficient mechanical strength, and shows small changes in characteristics.

The substrate may be formed from any appropriate ceramics material as long as such characteristics as described above can be achieved. Examples of the ceramics material include quartz, aluminum nitride (AlN), aluminum oxide ($Al_2O_3$), silicon carbide (SiC), magnesium oxide (MgO), and spinel ($MgAl_2O_4$).

The thickness of the substrate is preferably from 10 µm to 1 mm, more preferably from 0.2 mm to 0.8 mm. When the thickness falls within such ranges, there can be achieved a photonic crystal element, which can become independent as a single layer of the substrate and has a sufficient mechanical strength. Further, the propagation loss in the waveguide can be reduced.

As described above, the substrate 10 has periodically formed therein the holes 12. Any appropriate shape may be adopted as the shape of each of the holes as long as a desired photonic band gap can be formed in a waveguide for waves ranging from a millimeter wave to a terahertz wave. Specific examples of the shape of each of the holes include a substantially spherical shape, an elliptical spherical shape, a substantially circular columnar shape, a polygonal columnar shape (whose plan-view shape is, for example, a triangle, a quadrangle, a pentagon, a hexagon, or an octagon), and an indefinite shape. The holes may be through-holes, and for example, a plurality of substantially spherical holes may communicate to each other.

The size of each of the holes is preferably from 10 µm to 0.8 mm, more preferably from 50 µm to 0.6 mm, still more preferably from 70 µm to 0.4 mm. When the hole size falls within such ranges, a photonic band can be caused to appear in each of a millimeter wave band and a terahertz wave band. In addition, even when a periodic hole structure is formed, a photonic crystal element that is stable from the respective viewpoints of a mechanical strength and long-term reliability can be achieved.

The porosity of the substrate is as follows: pores each having a pore size of 1 µm or more are present at a ratio of preferably from 0.5 ppm to 3,000 ppm, more preferably from 0.5 ppm to 1,000 ppm, still more preferably from 0.5 ppm to 100 ppm. When the porosity falls within such ranges, densification can be achieved. Further, by virtue of a synergistic effect with the above-mentioned effect of setting the hole size within a predetermined range, even when a periodic hole structure is formed, a photonic crystal element that is stable from the respective viewpoints of a mechanical strength and long-term reliability can be achieved. Further, the grain diameter of the ceramics material can be reduced, and hence the shapes of the holes can be uniformized without any variation. Thus, the following advantage is obtained: the wavelength dependence characteristic of the transmittance of the substrate based on a photonic band becomes clear, and hence the bandwidth thereof can be widened. When the porosity is more than 3,000 ppm, the propagation loss in the waveguide may become larger. It is difficult to set the porosity to less than 0.5 ppm through a technology including using the sintered body of the ceramics material. In this description, the "pores" mean air bubbles (micropores) of the substrate (ceramics material) itself, and are different from the holes to be formed for forming the photonic crystal.

The sizes of the pores or the holes each have the following meanings: when the pores or the holes are each a substantially spherical shape, the sizes are each the diameter of the sphere; when the pores or the holes are each a substantially circular columnar shape, the sizes are each a diameter when the pore or the hole is viewed in plan view; and when the pores or the holes are each any other shape, the sizes are each the diameter of a circle inscribed in the pore or the hole. The presence or absence of the pores or the holes may be recognized through use of, for example, optical computed tomography (CT) or a transmittance-measuring device. The sizes of the pores or the holes may be measured with, for example, a scanning electron microscope (SEM). The sizes of the holes are relatively large, and hence may also be measured with a stereomicroscope or a laser shape-measuring device.

As described above, the holes 12 may be formed as a periodic pattern. The holes 12 are typically arrayed so as to form regular lattices. Any appropriate form may be adopted as the form of each of the lattices as long as a desired photonic band gap can be formed in a waveguide for waves ranging from a millimeter wave to a terahertz wave. Typical examples thereof include a triangular lattice and a square lattice.

The lattice pattern of the holes may be appropriately set in accordance with purposes and a desired photonic band gap. In the illustrated example, the holes each having a diameter "d" form square lattices at a period P. The square lattice patterns are formed on both the sides of the photonic crystal element, and the waveguide 16 is formed in the central portion thereof where no lattice pattern is formed. The width of the waveguide 16 may be, for example, from 1.01P to 3P (2P in the illustrated example) with respect to the hole period P. The number of the rows of the holes (hereinafter sometimes referred to as "lattice rows") in the waveguide direction may be from 3 to 10 (5 in the illustrated example) on each side of the waveguide. The hole period P may satisfy, for example, the following relationship:

$$(\tfrac{1}{7})\times(\lambda/n)\leq P\leq 1.4\times(\lambda/n)$$

where $\lambda$ represents the wavelength (nm) of light or an electromagnetic wave to be introduced into the waveguide, and "n" represents the refractive index of the substrate. The refractive index of the substrate is proportional to the ½-th power of the dielectric constant εr thereof, and hence the "n" in the above-mentioned formula may be replaced with "$(\varepsilon r)^{1/2}$". The hole period P is preferably from 10 μm to 1 mm, more preferably from 0.2 mm to 0.8 mm. In one embodiment, the hole period P may be comparable to the thickness of the sintered body (substrate). The diameter "d" of each of the holes is preferably from 0.1P to 0.9P, more preferably from 0.2P to 0.6P with respect to the hole period P. The width of the lattice pattern is preferably 10P or more, more preferably from 12P to 20P. The width of the lattice pattern is a distance between the outermost lattice row in the lattice pattern on one side of the waveguide and the outermost lattice row in the lattice pattern on the other side of the waveguide. Accordingly, the width of the lattice pattern on one side of the waveguide is 4P or more like the illustrated example. When the diameter "d" of each of the holes, the hole period P, the number of the lattice rows, the number of the holes in one lattice row, the thickness of the substrate, the kind (substantially, refractive index, dielectric constant, resistivity, and the like) of the ceramics material, the width of the line defect portion, and the like are adjusted by being appropriately combined with each other, the desired photonic band gap can be obtained. Although the waveguide 16 is a belt shape (linear shape) in the illustrated example, a waveguide having a predetermined shape (consequently, a predetermined waveguide direction) can be formed by changing the lattice pattern. For example, the waveguide may extend in a direction (oblique direction) having a predetermined angle with respect to the long-side direction or short-side direction of the photonic crystal element, or may be bent at a predetermined site (its waveguide direction may change at the predetermined site).

A method of producing the substrate made of the ceramics material having formed therein the holes (two-dimensional photonic crystal slab) is simply described below. In one embodiment, the two-dimensional photonic crystal slab may be produced by the near-net forming of a powder sintering method (substantially, slurry casting). The near-net forming of the powder sintering method (substantially, the slurry casting) is described below as an example of the method of producing the two-dimensional photonic crystal slab. The two-dimensional photonic crystal slab may be formed by the machining of a wafer in accordance with the kind of the ceramics material.

First, a forming mold having protruding portions corresponding to the lattice pattern is prepared. The protruding portions may form holes in a sintered body to be obtained. Accordingly, the shapes, sizes, and the like of the protruding portions may be designed in accordance with the shapes, sizes, and the like of the holes to be formed in the sintered body to be obtained. In one embodiment, through-holes may be formed by the protruding portions.

Next, a slurry containing the powder of the ceramics material, a predetermined dispersant, and a predetermined dispersion medium is cast into the above-mentioned forming mold. The dispersant may be appropriately selected in accordance with the ceramics material. The dispersant is typically an organic compound, more specifically, a resin. The dispersion medium may be an aqueous dispersion medium, or may be an organic solvent-based dispersion medium. Examples of the aqueous dispersion medium include water and a water-soluble alcohol. Examples of the organic solvent-based dispersion medium include paraffin, toluene, and petroleum ether. The slurry is prepared by mixing, for example, the powder of the ceramics material, the dispersant, and the dispersion medium, and as required, any other component (e.g., an additive). Examples of mixing means include a ball mill pot, a homogenizer, and a disperser.

Next, the cast slurry is solidified in the forming mold. Further, the solidified product is released from the mold, and is sintered under predetermined conditions. Thus, the sintered body of the ceramics material having a predetermined hole pattern (substrate: the two-dimensional photonic crystal slab) can be obtained. Firing for obtaining the sintered body typically includes a firing step and a calcining step to be performed before the firing step as required. A calcination temperature is preferably 1,000° C. or more and less than 1,250° C., more preferably from 1,000° C. to 1,200° C. When the calcination temperature falls within such ranges, a sintered body excellent in transparency can be obtained. A firing temperature is preferably from 1,500° C. to 1,700° C. The rate of temperature increase at the time of the firing is preferably 20° C./min or more at 1,000° C. or more, and is preferably 20° C./min or more, more preferably 25° C./min or more at 1,200° C. or more. When the rate of temperature increase falls within such ranges, the deformation of the sintered body to be obtained can be suppressed. In one embodiment, degreasing is performed before the firing. A degreasing temperature is preferably from 300° C. to 800° C. The above-mentioned calcination may double as the degreasing. The performance of the degreasing at 1,200° C. or less can suppress the deposition of a crystal phase.

A desired sintered body (substrate) can be obtained by appropriately combining, for example, the kind of the ceramics material, the concentration of the ceramics material in the slurry, the kind and addition amount of the dispersant, the kinds, number, combination, and addition amounts of the additives, and firing conditions.

While the sintered body of the ceramics material is difficult to etch and machine, the formation of a hole pattern before the sintering as described above enables simple and low-cost formation of the predetermined hole pattern in the sintered body of the ceramics material. As a result, a photonic crystal element, which shows small delay of an electric signal, shows a small propagation loss, and has uniform characteristics over its entirety, can be obtained simply and at low cost. When the relative dielectric constant of the substrate material is represented by $\varepsilon$, a frequency suitable for the photonic crystal element produced by such method is preferably from $125/\sqrt{\varepsilon}$ GHz to $15,000/\sqrt{\varepsilon}$ GHz.

Figure 2:
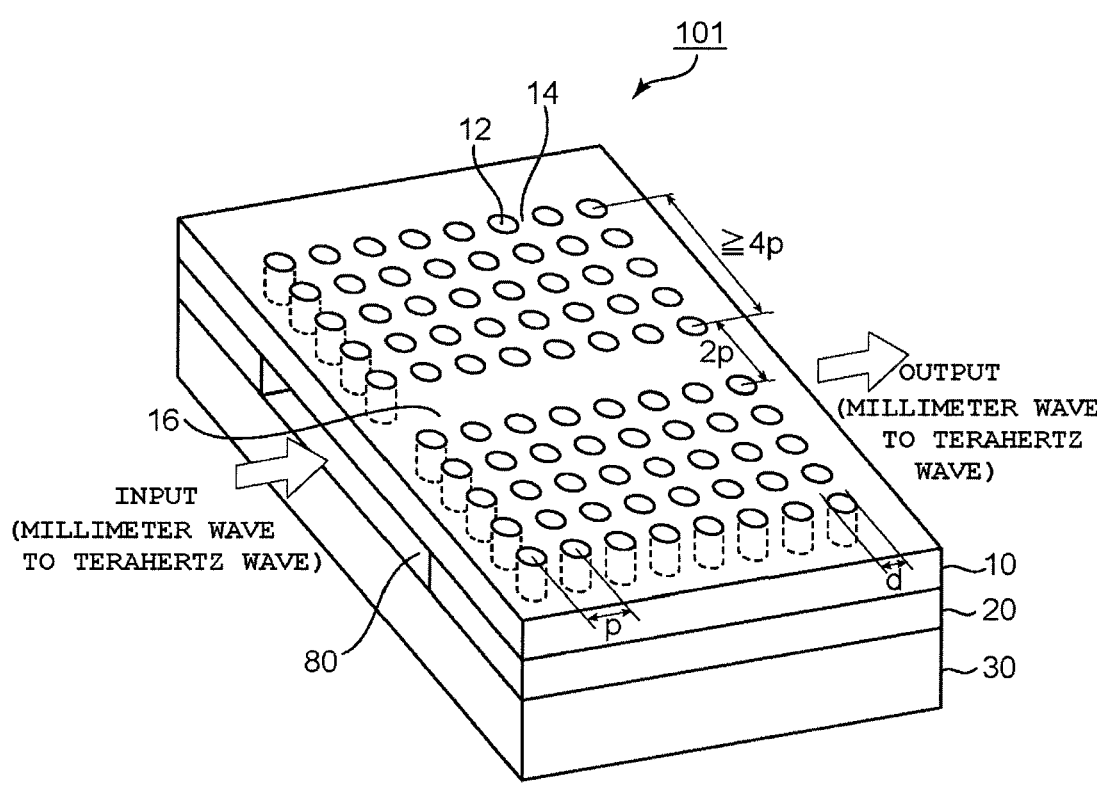
FIG. 2 is a schematic perspective view of a photonic crystal element according to another embodiment of the present invention.

The embodiment of an independent single layer has been described so far for the photonic crystal element. However, the photonic crystal element may be supported by a support substrate as illustrated in FIG. 2. A photonic crystal element 101 of the illustrated example further includes: a support substrate 30 arranged below the substrate 10, the support substrate being configured to support the substrate 10; a joining portion 20 configured to integrate the substrate 10 and the support substrate 30 with each other; and a cavity 80 defined by the lower surface of the substrate 10, the upper surface of the support substrate 30, and the joining portion 20. The arrangement of the support substrate can improve the strength of the photonic crystal element. As a result, the thickness of the substrate (two-dimensional photonic crystal slab) can be reduced.

Any appropriate configuration may be adopted for the support substrate 30. Specific examples of a material for forming the support substrate 30 include silicon (Si), glass, sialon ($Si_3N_4$—$Al_2O_3$), mullite ($3Al_2O_3 \cdot 2Si_2$, $2Al_2O_3 \cdot 3SiO_2$), aluminum nitride (AlN), silicon nitride ($Si_3N_4$), magnesium oxide (MgO), aluminum oxide ($Al_2O_3$), spinel ($MgAl_2O_4$), sapphire, quartz, crystal, gallium nitride (GaN), silicon carbide (SiC), and gallium oxide ($Ga_2O_3$). Of those, silicon, gallium nitride, silicon carbide, or germanium oxide is preferred. Such material enables the integration of the support substrate with a semiconductor circuit, such as an amplifier or a mixer, when the photonic crystal element is used in a front end for waves ranging from a millimeter wave to a terahertz wave (e.g., as an antenna substrate). It is preferred that the coefficient of linear expansion of the material for forming the support substrate 30 be as close as possible to the coefficient of linear expansion of a material for forming the substrate 10. With such configuration, the thermal deformation (typically, warpage) of the photonic crystal element can be suppressed. It is preferred that the coefficient of linear expansion of the material for forming the support substrate 30 fall within a range of from 50% to 150% with respect to the coefficient of linear expansion of the material for forming the substrate 10. From this viewpoint, the material for the support substrate may be the same as the material for the substrate 10.

The joining portion 20 is interposed between the substrate 10 and the support substrate 30 to integrate the substrates with each other. The joining portion 20 is formed as the remaining portion of etching at the time of the formation of the cavity 80. The joining portion 20 typically integrates the substrate 10 and the support substrate 30 with each other through direct joining of an upper layer and a lower layer. The integration of the substrate 10 and the support substrate 30 through the direct joining can satisfactorily suppress peeling in the photonic crystal element.

The term "direct joining" as used herein means that two layers or substrates (herein, the upper layer and the lower layer) are joined to each other without via any adhesive. The form of the direct joining may be appropriately set depending on the configuration of the layers or substrates to be joined to each other. For example, the direct joining may be achieved by the following procedure. In a high vacuum chamber (e.g., about $1 \times 10^{-6}$ Pa), a neutralized beam is applied to each joining surface of the upper layer and the lower layer. As a result, each joining surface is activated. Then, in a vacuum atmosphere, the activated joining surfaces are brought into contact with each other and joined to each other at normal temperature. A load at the time of the joining may be, for example, from 100 N to 20,000 N. In one embodiment, when the surface activation is performed with a neutralized beam, an inert gas is introduced into a chamber, and a high voltage is applied from a DC power source to electrodes arranged in the chamber. With such configuration, electrons move owing to an electric field generated between the electrode (positive electrode) and the chamber (negative electrode), and a beam of atoms and ions caused by the inert gas is generated. Of the beams having reached a grid, an ion beam is neutralized by the grid, and hence the beam of neutral atoms is emitted from a high-speed atom beam source. An atomic species for forming the beam is preferably an inert gas element (e.g., argon (Ar) or nitrogen (N)). A voltage at the time of activation by beam irradiation is, for example, from 0.5 kV to 2.0 kV, and an electric current is, for example, from 50 mA to 200 mA. A method for the direct joining is not limited thereto, and a surface activation method including using a fast atom beam (FAB) or an ion gun, an atomic diffusion method, a plasma joining method, or the like may also be applied. Any appropriate configuration may be adopted for each of the upper layer and the lower layer in accordance with purposes.

The cavity 80 is formed by removing the upper layer and the lower layer through etching as described above, and can function as a lower clad. The width of the cavity is preferably larger than the width of an optical waveguide. When the configurations of the upper layer and the lower layer, a mask, an etching manner, and the like are appropriately combined, the cavity can be formed by an efficient procedure and with high accuracy.

The photonic crystal element according to the embodiment of the present invention is used as, for example, an antenna, a band-pass filter, a coupler, a delay line (phase shifter), or an isolator. Each of those elements can be achieved without use of any metal wiring, and hence can suppress a conductor loss due to a skin effect and a radiation loss due to scattering.

As illustrated in each of FIG. 3 to FIG. 8, the photonic crystal element according to one embodiment of the present invention may include an active element capable of at least one of the transmission, reception, or amplification of an electromagnetic wave having a frequency of 30 GHz or more and 20 THz or less, the active element being supported by the support substrate.

In such photonic crystal element, the active element and a line substrate are integrated with each other to enable a wafer process, and hence characteristic variations can be reduced. Thus, an improvement in productivity of the photonic crystal element can be achieved. Accordingly, an inexpensive photonic crystal element can be achieved.

The photonic crystal element including the active element supported by the support substrate includes a configuration in which a line-defect waveguide formed in the two-dimensional photonic crystal slab and the active element are connected to each other so that an electromagnetic wave can be propagated therebetween.

Figure 3:
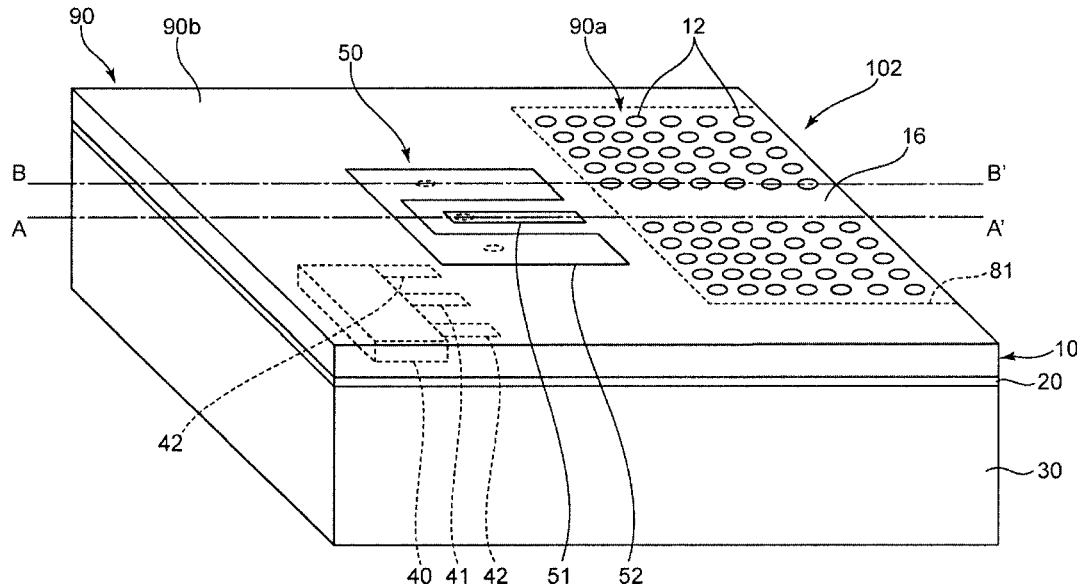
FIG. 3 is a schematic perspective view of a photonic crystal element according to still another embodiment of the present invention.
Figure 4:
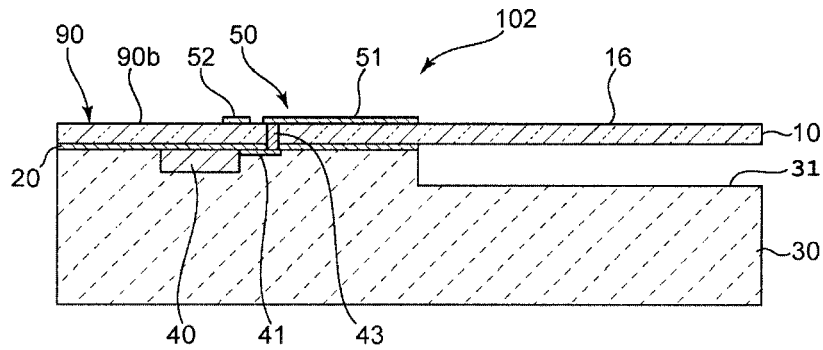
FIG. 4 is a sectional view of the photonic crystal element taken along the line AA' of FIG. 3.
Figure 5:
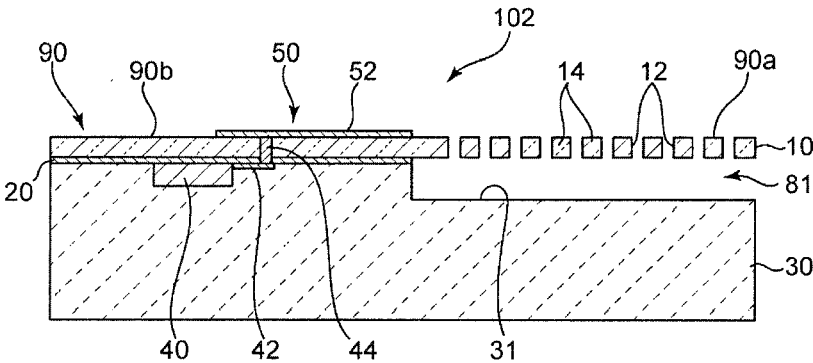
FIG. 5 is a sectional view of the photonic crystal element taken along the line BB' of FIG. 3.

A photonic crystal element 102 illustrated in each of FIG. 3 to FIG. 5 includes: a line-defect first waveguide formed in the two-dimensional photonic crystal slab; and a second waveguide (typically, a coplanar waveguide in the illustrated example) positioned between the active element and the first waveguide in the propagation path of the electromagnetic wave, the second waveguide being capable of guiding the electromagnetic wave. In one embodiment, the second waveguide can guide the electromagnetic wave transmitted from the active element to the first waveguide.

More specifically, the photonic crystal element 102 includes: a two-dimensional photonic crystal slab 90 having holes 12 periodically formed in the substrate 10 made of the ceramics material; the support substrate 30 arranged below the substrate 10, the support substrate being configured to support the substrate 10; an active element 40 supported by the support substrate 30; and a coplanar electrode pattern 50.

The two-dimensional photonic crystal slab 90 includes: a photonic crystal portion 90a where the holes 12 are periodically formed in the substrate 10; the line-defect waveguide 16 defined as a portion in the photonic crystal portion 90a (the substrate 10) where the holes 12 are not formed; and any other portion 90b except the photonic crystal portion 90a. Typically, the holes 12 are not formed in the other portion 90b.

In one embodiment, the support substrate 30 has a depressed portion 31. The depressed portion 31 is depressed downward from the upper surface of the support substrate 30. The depressed portion 31 is typically opened toward one side in the waveguide direction of the waveguide 16. The lower surface of the substrate 10 made of the ceramics material and the depressed portion 31 of the support substrate 30 define a cavity 81. Thus, the photonic crystal element 102 includes the cavity 81. The cavity 81 is a low-dielectric constant portion, and functions as a lower clad. When the photonic crystal element includes the cavity, the leakage of the electromagnetic wave propagating in the waveguide from the waveguide can be stably suppressed.

The cavity 81 typically overlaps the waveguide 16 in the thickness direction of the substrate 10, and the width (size in a direction perpendicular to the waveguide direction of the waveguide 16) of the cavity 81 is larger than the width of the waveguide 16. The cavity 81 preferably extends up to at least the third lattice row from the optical waveguide 16. The electromagnetic wave propagates in the waveguide, and moreover, part of the electromagnetic wave may diffuse up to the lattice row near the waveguide. Accordingly, the arrangement of the cavity directly below such lattice row can suppress a propagation loss. From this viewpoint, the cavity 81 more preferably extends up to the fifth lattice row from the waveguide 16, and particularly preferably extends so as to overlap the entire region of the photonic crystal portion 90a like the illustrated example.

In one embodiment, the substrate 10 made of the ceramics material (the two-dimensional photonic crystal slab 90) and the support substrate 30 are directly joined to each other by the joining portion 20. In the illustrated example, the joining portion 20 is interposed between the other portion 90b in the two-dimensional photonic crystal slab 90 and a portion except the depressed portion 31 in the support substrate 30 to integrate the substrate 10 and the support substrate 30 with each other.

The active element 40 is supported by the support substrate 30, and is typically buried in the portion except the depressed portion 31 on the upper surface of the support substrate 30. Examples of the active element 40 include a resonance tunnel diode, a Schottky barrier diode, a CMOS transceiver, and an InP HEMT.

In the illustrated example, the active element 40 is a resonance tunnel diode. The active element 40 can transmit (can generate and radiate) an electromagnetic wave. The active element 40 includes a first element electrode 41 and two second element electrodes 42. The first element electrode 41 and the two second element electrodes 42 each extend in the waveguide direction of the waveguide 16. The two second element electrodes 42 are arranged in the direction perpendicular to the waveguide direction of the waveguide 16 with a space therebetween. The first element electrode 41 is arranged between the two second element electrodes 42.

The coplanar electrode pattern 50 is arranged on the portion except the photonic crystal portion 90a (i.e., the other portion 90b) in the substrate 10 made of the ceramics material. The coplanar electrode pattern 50 and the other portion 90b positioned below the coplanar electrode pattern 50 form the coplanar waveguide serving as an example of the second waveguide.

The coplanar electrode pattern 50 is in line with the waveguide 16 in the waveguide direction. The coplanar electrode pattern 50 includes: a signal electrode 51 extending in the waveguide direction of the waveguide 16; and a ground electrode 52 having a U-shape when viewed in plan view, the shape being opened toward the waveguide 16. The signal electrode 51 is arranged on the inner side of the ground electrode 52, and is arranged with a space from the ground electrode 52. Thus, a void portion (slit) extending in the waveguide direction of the waveguide 16 is formed between the signal electrode 51 and the ground electrode 52. The signal electrode 51 is electrically connected to the first element electrode 41 of the active element 40 through a via 43. The ground electrode 52 is electrically connected to the second element electrodes 42 of the active element 40 through two vias 44.

The second waveguide is not limited to the coplanar waveguide, and may be formed as, for example, a microstrip waveguide or a waveguide tube-integrated waveguide.

Next, the propagation of the electromagnetic wave in the photonic crystal element 102 is described.

The application of a voltage to the coplanar electrode pattern 50 generates an electric field between the signal electrode 51 and the ground electrode 52. In addition, the application of a voltage to the active element 40 causes the active element 40 to transmit the electromagnetic wave. The electromagnetic wave transmitted from the active element 40 is propagated toward the signal electrode 51 through the via 43, and is then coupled with the electric field formed between the signal electrode 51 and the ground electrode 52 to be propagated in the substrate 10 toward the line-defect waveguide 16. Thus, the electromagnetic wave transmitted from the active element 40 is first propagated to the coplanar waveguide. Next, the electromagnetic wave is propagated from the coplanar waveguide to the line-defect waveguide 16, and is then propagated to the line-defect waveguide 16.

Figure 6:
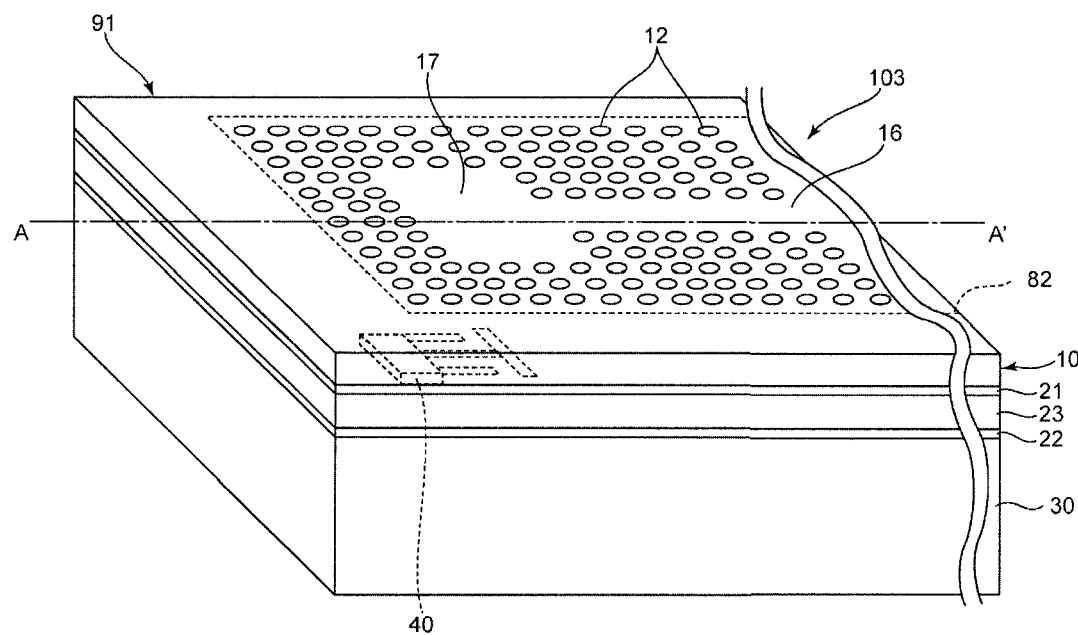
FIG. 6 is a schematic perspective view of a photonic crystal element according to still another embodiment of the present invention.
Figure 7:
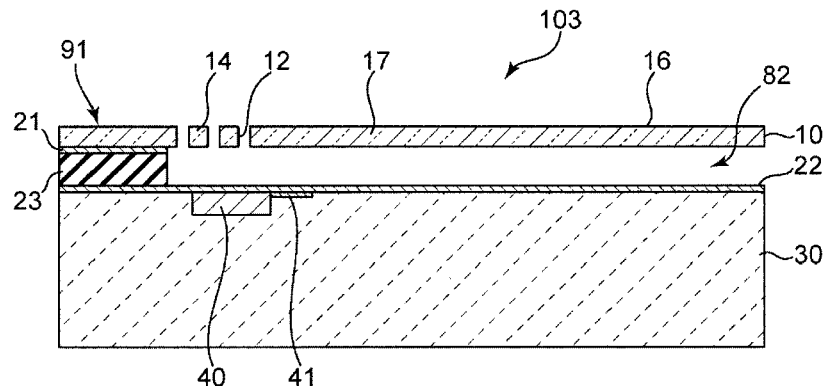
FIG. 7 is a sectional view of the photonic crystal element taken along the line AA' of FIG. 6.
Figure 8:
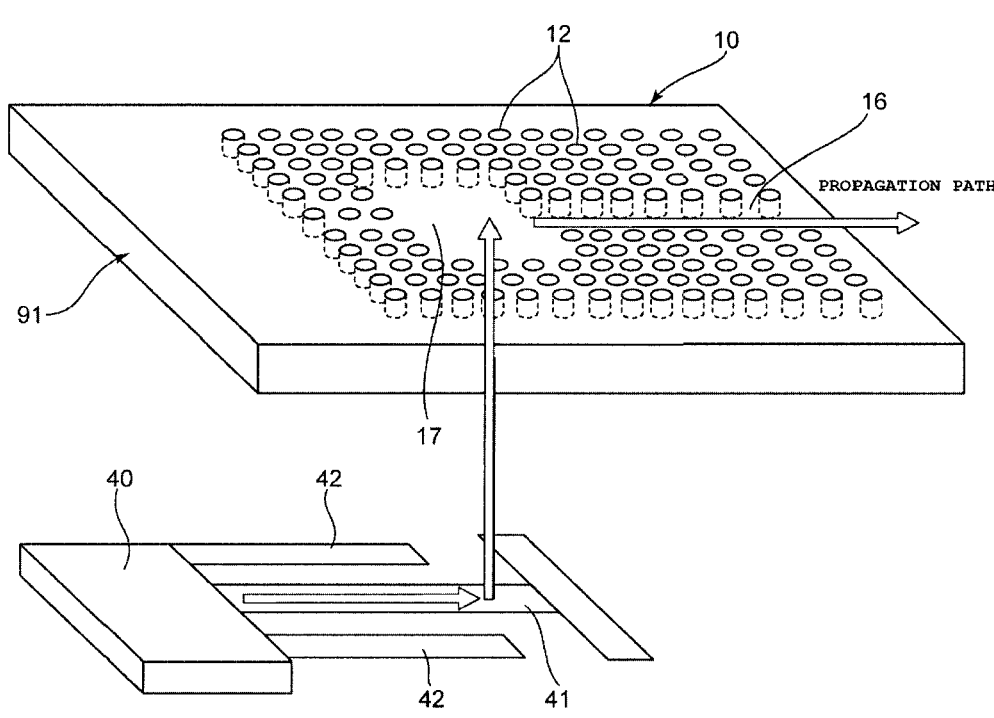
FIG. 8 is a schematic explanatory view for illustrating the propagation path of an electromagnetic wave in the photonic crystal element of FIG. 6.
Figure 9:
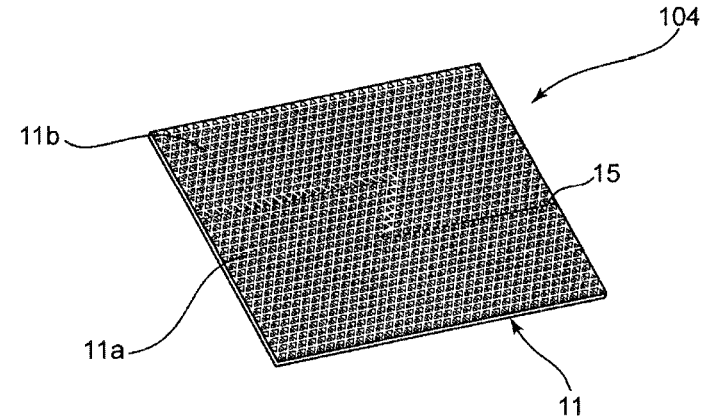
FIG. 9 is a schematic perspective view of a photonic crystal element according to still another embodiment of the present invention.
Figure 10:
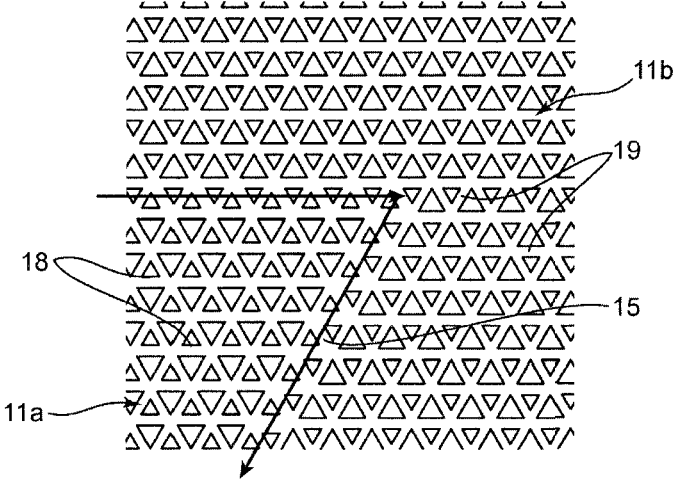
FIG. 10 is an enlarged plan view of the photonic crystal element of FIG. 9.
Figure 11A:
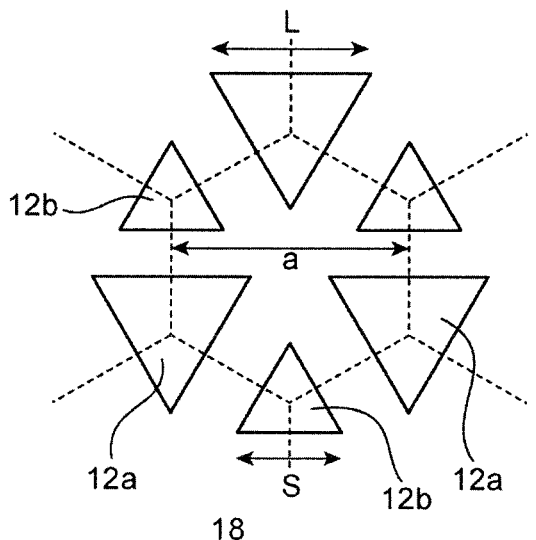
FIG. 11A and FIG. 11B are plan views of two different unit cells that the photonic crystal element of FIG. 9 includes.
Figure 11B:
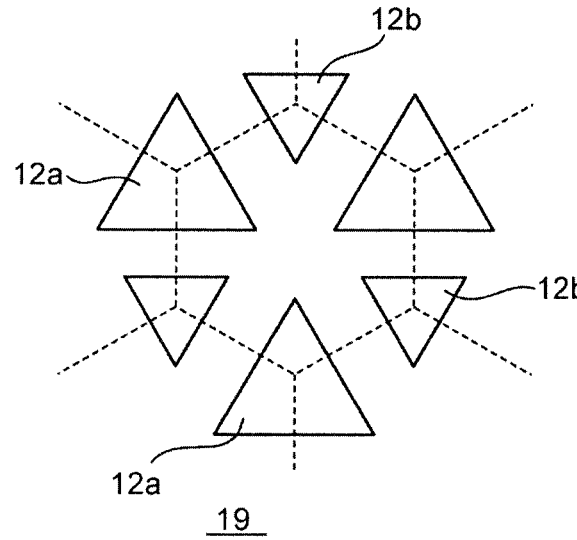

A photonic crystal element 103 illustrated in each of FIG. 6 to FIG. 8 includes: the line-defect waveguide 16 formed in the two-dimensional photonic crystal slab; and a resonator 17 formed in the two-dimensional photonic crystal slab, the resonator 17 being positioned between the active element 40 and the waveguide 16 in the propagation path of an electromagnetic wave, and being capable of guiding the electromagnetic wave. In one embodiment, the resonator can guide the electromagnetic wave transmitted from the active element to the waveguide.

More specifically, the two-dimensional photonic crystal slab 91 of the photonic crystal element 103 includes: the line-defect waveguide 16 defined as a portion where the holes 12 are not formed; and the mode-gap confinement resonator 17 defined as a portion where the holes 12 are not formed. The resonator 17 can receive the electromagnetic wave transmitted from the active element 40, and can transmit the received electromagnetic wave to the waveguide 16.

The resonator 17 is in line with the waveguide 16 in the waveguide direction of the waveguide 16, and is continuous with the waveguide 16. The width (size in the direction perpendicular to the waveguide direction of the waveguide 16) of the resonator 17 is larger than the width of the waveguide 16. In the illustrated example, the resonator 17 is formed so as to be surrounded by three rows of the holes.

In one embodiment, the photonic crystal element 103 includes an insulating layer 23 positioned between the substrate 10 made of the ceramics material (the two-dimensional photonic crystal slab 91) and the support substrate 30. A material for the insulating layer 23 is, for example, any one of the above-mentioned ceramics materials, and is preferably, quartz glass.

In the illustrated example, the substrate 10 made of the ceramics material (the two-dimensional photonic crystal slab 91) and the insulating layer 23 are directly joined to each other by a joining portion 21, and the support substrate 30 and the insulating layer 23 are directly joined to each other by a joining portion 22. The joining portion 21 is interposed between the substrate 10 and the insulating layer 23 to integrate the substrate 10 and the insulating layer 23 with each other. The joining portion 22 is interposed between the insulating layer 23 and the support substrate 30 to integrate the insulating layer 23 and the support substrate 30 with each other.

In addition, the insulating layer 23 of the illustrated example has a U-shape when viewed in plan view, the shape being opened toward one side in the waveguide direction of the waveguide 16. The lower surface of the substrate 10 made of the ceramics material, the upper surface of the support substrate 30, and the insulating layer 23 define a cavity 82. The cavity 82 may be defined by the lower surface of the substrate 10, the joining portion 22 positioned on the upper surface of the support substrate 30, and the insulating layer 23. Thus, the photonic crystal element 103 includes the cavity 82.

The cavity 82 typically overlaps the waveguide 16 and the resonator 17 in the thickness direction of the substrate 10, and the width (size in the direction perpendicular to the waveguide direction of the waveguide 16) of the cavity 82 is larger than the width of the resonator 17. The cavity 82 preferably extends up to the third lattice row from each of the waveguide 16 and the resonator 17, and particularly preferably extends so as to overlap the entire region of a hole-formed portion in the two-dimensional photonic crystal slab 91 like the illustrated example.

Next, the propagation of the electromagnetic wave in the photonic crystal element 103 is described.

When a voltage is applied to the active element 40 of the photonic crystal element 103, the first element electrode 41 functions as an antenna, and hence the electromagnetic wave is transmitted from the first element electrode 41 toward the resonator 17. The electromagnetic wave that has reached the resonator 17 is received by the resonator 17, and is then transmitted from the resonator 17 to the waveguide 16 through a continuous portion between the resonator 17 and the waveguide 16. After that, the electromagnetic wave is propagated to the waveguide 16.

In each of FIG. 3 to FIG. 8, the following example has been illustrated: the active element has a function of transmitting (generating and radiating) an electromagnetic wave, and the electromagnetic wave transmitted from the active element is coupled with the line-defect waveguide through the second waveguide or the resonator. However, in each of those figures, the following embodiment is easily conceivable: the active element has a function of receiving an electromagnetic wave, and the electromagnetic wave guided in the line-defect waveguide is coupled with the active element through the second waveguide or the resonator.

In addition, the two-dimensional photonic crystal slab of the photonic crystal element of the present invention is not limited to a two-dimensional photonic crystal slab including the above-mentioned line-defect waveguide.

As illustrated in each of FIG. 9 to FIGS. 11A and 11B, the two-dimensional photonic crystal slab may be a valley photonic crystal layer 11 in which a boundary between regions formed of two different unit cells functions as a waveguide.

The valley photonic crystal layer 11 includes: a first region 11*a* formed of a plurality of first unit cells 18; and a second region 11*b* formed of a plurality of second unit cells 19. The first region 11*a* and the second region 11*b* are adjacent to each other, and a boundary portion between the first region 11*a* and the second region 11*b* is formed as a waveguide 15.

Each of the first unit cells 18 and the second unit cells 19 is obtained by periodically forming two kinds of holes having different sizes in the substrate 10 made of the ceramics material. The holes are typically arrayed so as to form regular lattices. Any appropriate form may be adopted as the form of each of the lattices as long as a desired photonic band gap can be formed in a waveguide for waves ranging from a millimeter wave to a terahertz wave.

In each of the first unit cells 18 and second unit cells 19 of the illustrated example, three first holes 12*a* that are relatively large and three second holes 12*b* that are relatively small are arranged so as to form a honeycomb lattice (hexagonal lattice). In each unit cell, the first holes 12*a* and the second holes 12*b* are alternately arranged. The first unit cell 18 and the second unit cell 19 are in a 180° rotational symmetry (line symmetry) relationship. When the first unit cell 18 is rotated by 180° about the center of the lattice, the unit cell coincides with the second unit cell 19.

Each of the first holes 12a and the second holes 12b typically has an equilateral triangle shape. The length L of one side of each of the first holes 12a satisfies the following equation (1), and the length S of one side of each of the second holes 12b satisfies the following equation (2):

$$L = \frac{1.3a}{\sqrt{3}} \tag{1}$$

$$S = \frac{0.7a}{\sqrt{3}} \tag{2}$$

where L represents the length (μm) of one side of the first hole, S represents the length (μm) of one side of the second hole, and "a" represents an interval (μm) between opposite sides in the honeycomb lattice.

For example, when an electromagnetic wave having a frequency of 300 GHz is used, the interval between the opposite sides in the honeycomb lattice is preferably 250 μm or more and 500 μm or less, particularly preferably 400 μm.

The waveguide 15 can guide waves ranging from a millimeter wave to a terahertz wave, and is formed in the boundary portion between the first region 11a and the second region 11b. The waveguide 15 of the illustrated example is bent at a predetermined site (its waveguide direction changes at the predetermined site). However, when the shapes of the first region 11a and the second region 11b are changed to change the shape of the boundary therebetween, a waveguide having a desired shape can be formed. For example, the waveguide may extend in a linear fashion along the long-side direction or short-side direction of the photonic crystal element 104 without bending, or may extend in a direction (oblique direction) having a predetermined angle with respect to the long-side direction or short-side direction of the photonic crystal element 104.

EXAMPLES

Now, the present invention is specifically described by way of Examples. However, the present invention is not limited to these Examples.

Example 1

Such a photonic crystal element as illustrated in FIG. 1 was produced by the near-net forming of a powder sintering method (substantially, slurry casting). A specific production method is as described below. A forming mold having protruding portions corresponding to a hole pattern was prepared, and the fine powder of amorphous quartz, a hydrophilic dispersant (organic compound) that was decomposed or volatilized by preliminary firing, and a dispersion medium (water) were sufficiently mixed to prepare a slurry for near-net forming having a moisture content of from 15 wt % to 30 wt %. The slurry was cast into the forming mold, and the chemical reaction of the organic compound was utilized to solidify the slurry. The solidified product was released from the forming mold, and was fired at high temperature to produce such a photonic crystal element that a periodic hole pattern was formed in a sintered body. The forming mold was designed in consideration of its firing shrinkage ratio so that desired dimensions were obtained after the firing. The produced photonic crystal element was set to have a size measuring 30 mm by 30 mm, a thickness of 0.5 mm, a hole diameter of 0.2 mm, and a hole period of 0.5 mm. A portion where holes corresponding to one row were not formed was arranged in the central portion of the element to form a waveguide having a width of 1 mm. To measure the propagation loss of the waveguide, three photonic crystal elements having waveguide lengths of 10 mm, 30 mm, and 50 mm were produced. The resistivity of a substrate for forming each of the photonic crystal elements was 1 MΩ·cm.

The propagation losses of the resultant three photonic crystal elements were measured as described below. A generator for a RF signal in a 300 GHz band and a transmitting antenna were connected to the input side of each of the photonic crystal elements, and a receiving antenna and a RF signal receiver were connected to the output side thereof, followed by the measurement of the RF power of the signal with the RF signal receiver. The propagation losses (dB/cm) were calculated from the measurement results of the three photonic crystal elements. In addition, with regard to the delay of an electric signal, the phase thereof in the RF signal receiver was measured, and a delay ratio calculated from a phase difference among the photonic crystal elements having different waveguide lengths when the transmission time (unit: picosecond(s)) of Comparative Example 1 was set to 1 was determined. In addition, the dielectric loss tan δ of a material for the photonic crystal elements at 300 GHz was measured. The measurement was performed with a terahertz nondestructive measuring device manufactured by Nippo Precision Co., Ltd. by transmission measurement. The foregoing results are shown in Table 1.

Example 2

Such a photonic crystal element as illustrated in FIG. 1 was produced by using monocrystalline quartz (crystal) instead of the amorphous quartz. A specific production method is as described below. A crystal wafer measuring 4 inches by 4 inches by 0.5 mm thick was prepared. The direction of the wafer (substrate) parallel to a main orientation flat was defined as a normal optical axis, and the direction thereof perpendicular to the flat was defined as an abnormal optical axis. The same hole pattern and waveguide as those of Example 1 were formed in the wafer by ultrasonic spindle processing. A photonic crystal element I in which the direction of the waveguide was parallel to the normal optical axis and a photonic crystal element II in which the direction of the waveguide was parallel to the abnormal optical axis were produced. Three photonic crystal elements having waveguide lengths of 10 mm, 30 mm, and 50 mm were produced for each of the photonic crystal elements I and II. After the production of the photonic crystal elements, the substrate of each of the elements was cut into a size measuring 30 mm by 30 mm. The resistivity of the substrate for forming each of the photonic crystal elements was 1 MΩ·cm. The resultant photonic crystal elements were subjected to the same evaluations as those of Example 1. Further, the presence or absence of a characteristic variation resulting from anisotropy was evaluated from the propagation losses of the photonic crystal elements I and II. The results are shown in Table 1.

Example 3

Such a photonic crystal element as illustrated in FIG. 1 was produced by using polycrystalline aluminum nitride instead of the amorphous quartz. A specific production method is as described below. A polycrystalline aluminum nitride wafer measuring 4 inches by 4 inches by 0.32 mm thick was prepared. A hole pattern having a hole diameter of 0.08 mm and a hole period of 0.32 mm was formed in the wafer (substrate) by ultrasonic spindle processing. A portion where holes corresponding to one row were not formed was arranged in the central portion of the wafer to form a waveguide having a width of 0.64 mm. To measure the propagation loss of the waveguide, three photonic crystal elements having waveguide lengths of 10 mm, 30 mm, and 50 mm were produced. After the production of the photonic crystal elements, the substrate of each of the elements was cut into a size measuring 30 mm by 30 mm. The resistivity of the substrate for forming each of the photonic crystal elements was 1 MΩ·cm. The resultant photonic crystal elements were subjected to the same evaluations as those of Example 1. The results are shown in Table 1.

Comparative Example 1

Such a photonic crystal element as illustrated in FIG. 1 was produced by using monocrystalline silicon instead of the amorphous quartz. A specific production method is as described below. A monocrystalline silicon wafer measuring 4 inches by 4 inches by 0.3 mm thick was prepared. A hole pattern having a hole diameter of 0.075 mm and a hole period of 0.3 mm was formed in the wafer (substrate) by ultrasonic spindle processing. A portion where holes corresponding to one row were not formed was arranged in the central portion of the wafer to form a waveguide having a width of 0.6 mm. To measure the propagation loss of the waveguide, three photonic crystal elements having waveguide lengths of 10 mm, 30 mm, and 50 mm were produced. After the production of the photonic crystal elements, the substrate of each of the elements was cut into a size measuring 30 mm by 30 mm. The resistivity of the substrate for forming each of the photonic crystal elements was 10 kΩ·cm. The resultant photonic crystal elements were subjected to the same evaluations as those of Example 1. The results are shown in Table 1.

TABLE 1

| | Substrate material | Di-electric loss tanδ | Propagation loss (dB/cm) I | Propagation loss (dB/cm) II | Varia-tion | Trans-mission time (ps) | Delay ratio |
|---|---|---|---|---|---|---|---|
| Example 1 | Amorphous quartz | 0.001 | 0.30 | — | Absent | 195 | 0.57 |
| Example 2 | Mono-crystalline quartz | 0.001 | 0.40 | 0.35 | Present | 212 | 0.62 |
| Example 3 | Poly-crystalline aluminum nitride | 0.001 | 0.50 | — | Absent | 291 | 0.85 |
| Com-parative Example 1 | Mono-crystalline silicon | 0.002 | 0.50 | — | Absent | 342 | 1.00 |

As is apparent from Table 1, the photonic crystal elements of Examples of the present invention using the ceramics materials can each significantly reduce the delay amount of an electric signal as compared to the photonic crystal element of Comparative Example 1 using the semiconductor material. In addition, the photonic crystal elements of Examples can each reduce the propagation loss. Further, as is apparent from comparison between each of Examples 1 and 3, and Example 2, the use of the polycrystalline or amorphous material in the substrate can prevent the characteristic variation (herein, the propagation loss) resulting from the anisotropy like a case in which the single crystal is used.

INDUSTRIAL APPLICABILITY

The photonic crystal element according to the embodiment of the present invention may be used in a wide variety of fields including an optical waveguide, next-generation high-speed communication, a sensor, laser processing, and photovoltaic power generation, and may be suitably used particularly as a waveguide for waves ranging from a millimeter wave to a terahertz wave. Such photonic crystal element may be used as, for example, an antenna, a band-pass filter, a coupler, a delay line (phase shifter), or an isolator.

What is claimed is:

1. A photonic crystal element, comprising a two-dimensional photonic crystal slab having holes periodically formed in a substrate made of a ceramics material, the photonic crystal element being configured to guide an electromagnetic wave having a frequency of 30 GHz or more and 20 THz or less, wherein the ceramics material is polycrystalline or amorphous, and wherein the substrate has pores each having a pore size of 1 μm or more at a ratio of from 0.5 ppm to 3.000 ppm.

2. The photonic crystal element according to claim 1, further comprising:

a support substrate arranged below the substrate, the support substrate being configured to support the substrate;

a joining portion configured to integrate the substrate and the support substrate with each other; and a cavity defined by a lower surface of the substrate, an upper surface of the support substrate, and the joining portion.

3. The photonic crystal element according to claim 1, wherein a period of the holes is from 10 μm to 1 mm.

4. The photonic crystal element according to claim 1, wherein the substrate has a dielectric constant of from 3.6 to 11.5 at from 100 GHz to 10 THz.

5. The photonic crystal element according to claim 1, wherein the substrate has a dielectric loss of 0.01 or less.

6. The photonic crystal element according to claim 1, wherein the substrate has a resistivity of 100 kΩ·cm or more.

7. The photonic crystal element according to claim 1, wherein the ceramics material is one selected from the group consisting of: quartz; aluminum nitride; aluminum oxide; silicon carbide; magnesium oxide; and spinel.

8. The photonic crystal element according to claim 1, further comprising a waveguide defined in a portion in the substrate where the holes are free from being formed, the waveguide being configured to guide the electromagnetic wave having a frequency of 30 GHz or more and 20 THz or less.

9. The photonic crystal element according to claim 1, wherein the photonic crystal element is usable as an antenna, a band-pass filter, a coupler, a delay line, or an isolator.

10. A photonic crystal element comprising:

a two-dimensional photonic crystal slab having holes periodically formed in a substrate made of a ceramics material, a support substrate arranged below the substrate, the support substrate being configured to support the substrate; and an active element capable of at least one of transmission, reception, or amplification of the electromagnetic wave, the active element being supported by the support substrate, the photonic crystal element being configured to guide an electromagnetic wave having a frequency of 30 GHz or more and 20 THz or less, wherein the substrate has pores each having a pore size of 1 μm or more at a ratio of from 0.5 ppm to 3,000 ppm.

11. The photonic crystal element according to claim 10, further comprising:

a line-defect first waveguide defined in a portion in the substrate where the holes are free from being formed; and a second waveguide positioned between the active element and the first waveguide in a propagation path of the electromagnetic wave, the second waveguide being capable of guiding the electromagnetic wave.

12. The photonic crystal element according to claim 10, further comprising:

a line-defect waveguide defined in a portion in the substrate where the holes are free from being formed; and a resonator defined in the portion in the substrate where the holes are free from being formed, the resonator being positioned between the active element and the waveguide in a propagation path of the electromagnetic wave, and being capable of guiding the electromagnetic wave.

13. The photonic crystal element according to claim 10, wherein the substrate and the support substrate are directly joined to each other.

14. The photonic crystal element according to claim 13, wherein the support substrate has a depressed portion, and wherein the photonic crystal element comprises a cavity defined by a lower surface of the substrate and the depressed portion of the support substrate.

15. The photonic crystal element according to claim 13, further comprising:

an insulating layer positioned between the substrate and the support substrate; and a cavity defined by a lower surface of the substrate, an upper surface of the support substrate, and the insulating layer.

16. A photonic crystal element, comprising:

a two-dimensional photonic crystal slab having holes periodically formed in a substrate made of a ceramics material;

a support substrate arranged below the substrate, the support substrate being configured to support the substrate;

a joining portion configured to integrate the substrate and the support substrate with each other;

a cavity defined by a lower surface of the substrate, an upper surface of the support substrate, and the joining portion; and a waveguide defined in a portion in the substrate where the holes are free from being formed, the waveguide being configured to guide the electromagnetic wave having a frequency of 30 GHz or more and 20 THz or less, wherein the ceramics material is polycrystalline or amorphous, wherein the substrate has pores each having a pore size of 1 μm or more at a ratio of from 0.5 ppm to 3,000 ppm, wherein a period of the holes is from 10 μm to 1 mm, wherein the substrate has a dielectric constant of from 3.6 to 11.5 at from 100 GHz to 10 THz, wherein the substrate has a dielectric loss of 0.01 or less, wherein the substrate has a resistivity of 100 kΩ·cm or more, wherein the ceramics material is one selected from the group consisting of: quartz; aluminum nitride; aluminum oxide; silicon carbide; magnesium oxide; and spinel, wherein the photonic crystal element is usable as an antenna, a band-pass filter, a coupler, a delay line, or an isolator.

* * * * *